(12) United States Patent
Singamsetty et al.

(10) Patent No.: US 9,547,462 B2
(45) Date of Patent: Jan. 17, 2017

(54) SYSTEM AND METHOD FOR PRINTING

(71) Applicant: Hewlett-Packard Development Company, L.P., Houston, TX (US)

(72) Inventors: Saikrishna Singamsetty, Bangalore (IN); Virender Singh, Faridabad (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/763,509

(22) PCT Filed: Jan. 29, 2013

(86) PCT No.: PCT/IN2013/000057
§ 371 (c)(1),
(2) Date: Jul. 25, 2015

(87) PCT Pub. No.: WO2014/118790
PCT Pub. Date: Aug. 7, 2014

(65) Prior Publication Data
US 2016/0077773 A1 Mar. 17, 2016

(51) Int. Cl.
*G06F 3/12* (2006.01)
(52) U.S. Cl.
CPC .......... *G06F 3/1211* (2013.01); *G06F 3/1219* (2013.01); *G06F 3/1243* (2013.01); *G06F 3/1244* (2013.01); *G06F 3/1246* (2013.01); *G06F 3/1285* (2013.01); *G06F 3/1296* (2013.01); *G06F 3/1248* (2013.01)
(58) Field of Classification Search
USPC ...... 358/1.15, 1.14, 1.13, 500, 400, 401, 1.9
See application file for complete search history.

(56) References Cited

U.S. PATENT DOCUMENTS

| 5,081,595 A | 1/1992 | Moreno et al. |
| 5,530,463 A | 6/1996 | Nystrom et al. |
| 6,988,839 B1 | 1/2006 | Yu |
| 7,057,747 B1 | 6/2006 | Minagawa |

(Continued)

FOREIGN PATENT DOCUMENTS

| CN | 2900168 | 5/2007 |
| CN | 101027187 | 8/2007 |

(Continued)

OTHER PUBLICATIONS

International Search Report, The State Intellectual Property Office, the PR.China, Oct. 31, 2013, PCT Patent Application No. PCT/IN2013/000057, 4 pages.

(Continued)

*Primary Examiner* — Jerome Grant, II
(74) *Attorney, Agent, or Firm* — HP Inc-Patent Department

(57) ABSTRACT

Systems and methods for printing with multiple print settings are described herein. In one implementation, the method of printing with multiple print settings comprises receiving a job file indicative of a print assignment comprising a plurality of pages, wherein at least one of the plurality of pages has a different print setting. The method further comprises analyzing the job file to determine page settings for each of the plurality of page assignments. A print job is generated for printing each of the plurality of pages in accordance with the print setting and page settings associated with each of the plurality of pages.

12 Claims, 4 Drawing Sheets

(56) References Cited

U.S. PATENT DOCUMENTS

| | | | |
|---|---|---|---|
| 8,007,085 B2 | 8/2011 | Silverbrook et al. | |
| 8,131,166 B2 | 3/2012 | Mastie et al. | |
| 2003/0206312 A1* | 11/2003 | McAfee | G06F 3/1204 358/1.15 |
| 2005/0140758 A1 | 6/2005 | Merz et al. | |
| 2006/0170144 A1* | 8/2006 | Mandel | B65H 3/40 271/3.01 |
| 2006/0262335 A1 | 11/2006 | Varga | |
| 2008/0003011 A1* | 1/2008 | Unno | G03G 15/6508 399/82 |
| 2008/0222045 A1 | 9/2008 | Mukerji et al. | |
| 2009/0052930 A1* | 2/2009 | Yoshimura | G03G 15/6588 399/81 |
| 2009/0244183 A1 | 10/2009 | Silverbrook et al. | |
| 2009/0303512 A1 | 12/2009 | Morales | |
| 2010/0123762 A1 | 5/2010 | Freitag et al. | |
| 2010/0225705 A1 | 9/2010 | Silverbrook et al. | |
| 2010/0277547 A1 | 11/2010 | Silverbrook et al. | |
| 2011/0032569 A1* | 2/2011 | Ohashi | G06F 3/1208 358/1.15 |
| 2011/0052242 A1* | 3/2011 | Kamata | G03G 15/5016 399/82 |
| 2011/0075216 A1* | 3/2011 | Toizumi | G06F 3/1219 358/1.15 |
| 2011/0116817 A1 | 5/2011 | Heid et al. | |
| 2011/0157630 A1* | 6/2011 | Otaka | G06F 3/1208 358/1.15 |
| 2011/0317208 A1 | 12/2011 | Kaneda | |
| 2012/0170064 A1* | 7/2012 | Hibino | G06F 3/1205 358/1.9 |
| 2012/0188586 A1* | 7/2012 | Gaertner | G06F 3/1204 358/1.15 |
| 2012/0218592 A1* | 8/2012 | Carney | G06F 3/1203 358/1.15 |
| 2013/0343773 A1* | 12/2013 | Monahan | G03G 15/2025 399/45 |
| 2015/0138578 A1* | 5/2015 | Kashiwagi | B65H 37/04 358/1.12 |
| 2015/0210494 A1* | 7/2015 | Takata | G03G 15/502 358/1.15 |
| 2015/0378648 A1* | 12/2015 | Yasukawa | G06F 3/1219 358/1.14 |
| 2016/0011555 A1* | 1/2016 | Akimoto | G03G 15/5016 399/81 |

FOREIGN PATENT DOCUMENTS

| | | |
|---|---|---|
| CN | 102310667 | 1/2012 |
| JP | H09212040 | 8/1997 |
| JP | 2006044808 | 2/2006 |
| JP | 2008105258 | 5/2008 |
| JP | 2010208130 | 9/2010 |

OTHER PUBLICATIONS

Lacroix, L., How Do I Choose Different Types or Sizes of Media to Print on? (Letterhead, Envelopes, Labels, Etc.), Sep. 3, 2009, https://wiki.carleton.edu/pages/viewpage.action?pageId=884789.

* cited by examiner

SYSTEM AND METHOD FOR PRINTING

CROSS-REFERENCE TO RELATED APPLICATION

This application is a U.S. National Stage Application of and claims priority to International Patent Application No. PCT/IN2013/000057, filed on Jan. 29, 2013, and entitled "SYSTEM AND METHOD FOR PRINTING," which is hereby incorporated by reference in its entirety.

BACKGROUND

Large format printing is generally used by technical production houses, graphical production houses, enterprises, offices, and low end industrial segments. The documents for large format printing are generally processed to create print jobs and the same are transmitted to a large format printer (LFP) for printing. The print jobs, usually identified by a unique job ID, may define a specific LFP to be used as well as define print settings for the documents. The print settings may include the media on which the document is to be printed and page settings for the document.

Generally business houses attempt to achieve high utilization of LFP by running it continuously with minimal manual intervention. The manual intervention is usually done to change the media on which printing is to be done as per the requirements of the print job or when a roll of media is completely used up. Some of the LFPs also provide multiple roll support, wherein multiple rolls of the same media may be initially loaded so that the LFP can process print jobs, pertaining to the same media, with lower frequency of manual intervention, thus leading to enhanced productivity. Further, most LFPs are integrated with multiple output accessories, like duplexer, folder, and stacker, which enhance the functionalities of the LFP and cater to extended business needs.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
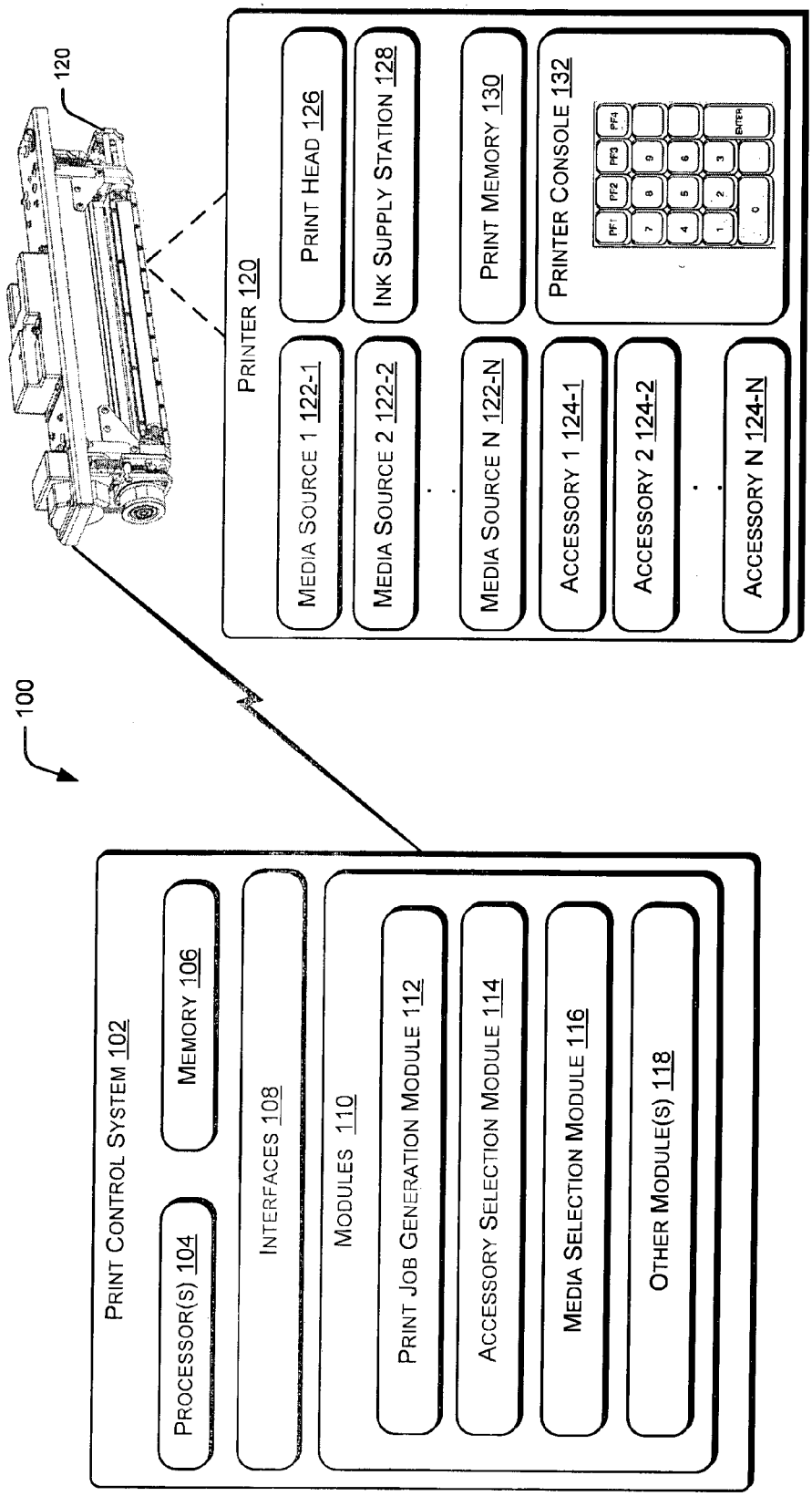
FIG. 1 schematically illustrates the components of a printing system, according to an example of the present subject matter.

The present subject matter relates to systems and methods for printing with multiple print settings.

Business houses generally attempt to run the LFPs with minimal interruption or manual intervention so as to increase productivity. Manual intervention is needed usually to change the roll of media, for example, a first print job may have to be printed on a translucent media, a second print job may have to be printed on a semi gloss paper, a third print job may have to be printed on a photo paper and a fourth print job may have to be printed on canvas paper. The process of changing the media involves unloading the existent roll of media from the LFP and loading a new roll of the media, on which printing is to be done, onto the LFP. Further, changing the media may also involve feed cutting the media, wherein LFP printer slightly advances the media and makes a straight cut across the front edge. Moreover, the media has to be calibrated, wherein adjustments are made on how the printer compensates for the thickness and weight of the media as the media is being feed off of the roll. Such a process is usually cumbersome and time consuming, resulting in lower productivity. Further, manual interventions causes delay in processing of print jobs leading to high maintenance costs of print head and wastage of media in form of feed cut and media calibration.

Generally, printing assignments comprise documents of multiple pages, each of which may have to be printed on different media. Further, the page settings of each page may be different. For example, certain pages may need to be printed on both sides of the media and certain pages may need to be stacked in order. The current printing process involves generating a print job for each page of the document. As the number of possible combinations of print media, page settings, and output accessories to be used increases, the complexity of creation of the print job increases. Most commercial printers attempt to reduce the complexity of the print jobs by creating multiple print jobs, each of a single page, and manually configuring the roll of media and output accessories, leading to wastage of media and loss of productivity.

The systems and methods, described herein, implement printing with multiple print settings. In one example, the method of printing with multiple print settings is implemented using a print control system and a printer. The print control system may be implemented as any computing device, such as personal computers, servers, network servers, and servers. In another example, the print control system may be implemented as an integrated module of the printer. The printer may be any printer with at least one source of media and may have at least one accessory. For example, the printer may be a large format printer (LFP) which has at least one roll as the source of media and at least one accessory in form of a duplexer, stacker, etc. The printer may also be an office printer or an inkjet printer or a laser printer which has at least one tray as the source of media and may have at least one accessory for providing additional functionalities. For the sake of explanation, it is assumed that the printer has multiple rolls of media, wherein each roll is loaded with a different type of media. For example, first roll may be loaded with canvas paper, second roll may be loaded with photo paper, third roll may be loaded with a vinyl media, and fourth roll may be loaded with translucent media.

In one implementation, a printing assignment is received by the print control system. The printing assignment comprises printing a document of multiple pages, wherein each page has different print settings. The print settings of each page may define the media on which the page is to be printed and the page settings of each page. The page settings of the page may define the margins for each page, whether any header or footer is to be printed, whether background image is to be printed, whether the page is to be printed on a grayscale and so on. For the purpose of describing the implementation, it is assumed that the document comprises of five pages, wherein the first page to be printed on a first media, the second page is to be printed on a third media, the third and fourth page are to be printed in duplex on a second media, and the fifth page is to be printed on the first media.

In one implementation, a user provides the details pertaining to the printing assignment in form of a job file. The job file may be implemented, for example, in form of an extensible markup language (XML) file. Based on the job file, the print control system may define the print job in a printer job language (PJL). The print job may include commands in a printer language, such as printer command language (PCL), based on the model of the printer, for the printer to process the print job.

In one implementation, the print control system may generate a print job, wherein the pages are arranged in accordance to the media type. For example, a generated print job may be in the order of the first page, the fifth page, the second page, the third page, and the fourth page. The generated print job is then transmitted to the printer.

In one configuration, the print control system may operate in a compatibility mode when connected to a printer having a single source of media. In the compatibility mode, the print control system generates multiple print jobs, wherein each print job is for a specific media type. In case of the above scenario, the print control system may define a first print job for the first page and the fifth page which are to be printed on the first media, a second pint job for the second page which is to be printed on the third media, and a third print job for the third page and the fourth page which are to be printed in duplex on the second media. Creating multiple print jobs in the compatibility mode facilitates manual intervention for changing the media type loaded onto the printer having a single source of media. For example, the printer may pause after each print job is executed to facilitate change of media. In said example, the printer may proceed with execution of a subsequent print job on receiving a user input indicating that the new media has been successfully loaded.

In one scenario, the print assignment may require the document to be printed on a number of media types, all of which may not be loaded onto the printer at once. For example, in the aforementioned case, the document is to be printed on three different media types. It is possible that the printer may support two sources of media. In such a case, the print control system may define multiple print jobs based on the media types already loaded onto the printer. For example, if the first media and the second media are loaded onto the printer, the print control system may define two print jobs. The first print job is defined for the first page and the fifth page which are to be printed on the first media, and the third page and the fourth page which are to be printed in duplex on the second media. The second print job may be defined a second pint job for the second page which is to be printed on the third media.

Thus, the print control system as described above minimizes manual intervention during printing by using printers with multiple sources of media, wherein each source is loaded with a different type of media. The print control system is backward compatible and works with printers which have a single source of media. The print control system enhances productivity, reduces maintenance cost, and reduces wastage of media.

The above systems and methods are further described in conjunction with the following figures. It should be noted that the description and figures merely illustrate the principles of the present subject matter. Further, various arrangements may be devised that, although not explicitly described or shown herein, embody the principles of the present subject matter and are included within its spirit and scope.

The manner in which the systems and methods for printing with multiple print settings are implemented shall be explained in details with respect to FIGS. 1 to 4. While aspects of described systems and methods for printing with multiple print settings can be implemented in any number of different computing systems, environments, and/or configurations, the examples and implementations are described in the context of the following system(s).

FIG. 1 schematically illustrates the components of a printing system 100, according to an example of the present subject matter. In one implementation, the printing system 100 comprises a print control system 102 and a printer 120. The print control system 102 may be implemented as various computing devices, such as a computer, a server, a network server, a print server, and the like. Further, the print control system 102 may be implemented as an integrated module or component of the printer 120.

In one implementation, the print control system 102 includes a processor 104, and a memory 106 connected to the processor 104. The processor 104 may include microprocessors, microcomputers, microcontrollers, digital signal processors, central processing units, state machines, logic circuitries and/or any other devices that manipulate signals and data based on operational instructions. Among other capabilities, the processor 104 may fetch and execute computer-readable instructions stored in the memory 106.

In another implementation of the present subject matter, the print control system 102 may also include a memory 106. The memory 106 may be communicatively coupled to the processor 104. The memory 106 can include any commercially available non-transitory computer-readable medium including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the print control system 102 includes various interfaces 108. The interfaces 108 may include a variety of commercially available interfaces, for example, interfaces for peripheral device(s), such as data input output devices, referred to as I/O devices, storage devices, network devices, etc. The I/O device(s) may include Universal Serial Bus (USB) ports, Ethernet ports, host bus adaptors, etc., and their corresponding device drivers. The interfaces 108 facilitate the communication of the print control system 102 with various communication and computing devices and various communication networks, such as networks that use a variety of protocols, for example, Hypertext Transfer Protocol (HTTP) and Transmission Control Protocol/Internet Protocol (TCP/IP).

Further, the print control system 102 may include modules 110. The modules 110 may be coupled to the processors 104. The modules 110, amongst other things, include routines, programs, objects, components, data structures, etc., which perform particular tasks or implement particular abstract data types. The modules 110 may also be implemented as, signal processor(s), state machine(s), logic circuitries, and/or any other device or component that manipulate signals based on operational instructions.

Further, the modules 110 can be implemented in hardware, computer-readable instructions executed by a processing unit, or by a combination thereof.

In said implementation, the modules 110 include a print job generation module 112, an accessory selection module 114, a media selection module 116, and other module(s) 118. The other module(s) 118 may include programs or coded instructions that supplement applications or functions performed by the print control system 102.

In one implementation, the print control system 102 is communicatively coupled to the printer 120. The printer 120 may be implemented as a variety of printers, such as a large format printer, an inkjet printer, a laser printer and a multi function printer. In one implementation, the printer 120 includes multiple media sources, such as the media source-1 122-1, media source-2 122-2, . . . and media source-N 122-N. The media sources are henceforth collectively referred to as the media sources 122 and singularly as the media source 122. The media sources 122 may be in various forms, for example in form of rolls for a large format printer and in form of trays for a laser printer. In one implementation, each of the media sources 122 of the printer 120 is loaded with a different type of media, such as canvas paper, photo paper, self-adhesive paper and translucent paper. The printer 120 further includes multiple accessories, such as the accessory-1 124-1, accessory-2 124-2, . . . and accessory-N 124-N. The accessories are henceforth collectively referred to as the accessories 124 and singularly as the accessory 124. The accessories 124 may include stackers, duplexers, paper trays, and folders. Further the printer 120 may include a print head 126 for printing, an ink supply station 128 as the source of ink, a print memory 130 for storing print jobs, a printer console 132 for configuring the printer 120, and other modules (not shown in figure) which provide various functionalities to the printer 120.

In operation, the print control system 102 may initialize and update its print database with all the printers, such as the printer 120, communicatively coupled to it. In case, there are multiple printers connected, the print control system 102 may uniquely identify each printer by the printer name or its internet protocol (IP) address or the name of the port through which the printer is connected.

Generally, a user provides a printing assignment which comprises printing a document of multiple pages. In many cases each page of the document may have to be printed on different media type with same or different print settings. The printing assignment is received by the print job generation module 112 in form of a job file, which may be in form of an extensible markup language (XML) file.

In one implementation, the job file may be parsed by the print job generation module 112 to determine print settings for each page of the document. In said implementation, the media selection module 116 may analyze the parsed job file to determine the media on which each page of the document is to be printed. The print job generation module 112 may also ascertain the page settings for each page. Based on the page settings, the print job generation module 112 may determine various print parameters, such as margins, whether background image or background text is to be printed, whether the page is to be printed in grayscale, whether header and footer information is to be printed, whether the page is to be printed in duplex, whether the output is to be stacked and the print mode to be used. The print mode may be indicative of the mode in which the printer 120 should print the page. For example, the page may be printed in an economy mode which saves ink or the page may be printed in a draft mode which gives faster output or the page may be printed in a high quality mode which uses higher volume of ink and may take more time to process but produces high quality output. Based on the page settings, the accessory selection module 114 may activate the requisite accessories 124 of the printer 120.

The print job generation module 112 may then define the print job in form of a printer job language (PJL). In one implementation, print job generation module 112 may generate the print job wherein the pages are arranged in accordance to the media type. The print job may include commands, in a printer language, such as printer command language (PCL), based on the model of the printer 120, for the printer 120 to process the print job. For example, the print job generation module 112 may generate the following command for printing the first page on the first media which is loaded on the first media source 122-1: PJL SET MEDIA SOURCE=Roll 1 & PJL SET MEDIAID="1".

In certain cases, the print control system 102 may be connected to a printer 120 which has a single source of media. In such cases, the print job generation module 112 may operate in a compatibility mode. In compatibility mode, the print job generation module 112 may generate multiple print jobs, wherein each print job is for a specific media type. Operating in the compatibility mode facilitates manual intervention for changing the media type loaded onto the printer having a single source of media.

In another scenario, the print assignment may require the document to be printed on a number of media types, all of which may not be loaded onto the printer 120 at once due to limitations in the number of media sources 122. In such a case, the print job generation module 112 may define multiple print jobs based on the media types already loaded onto the printer.

Thus, the print control system 102 as described above enables processing of jobs which are to be printed on multiple media without having to manually create a print job for each page based on media type or print settings. This enhances the printer running time, thus enhancing productivity and minimizing wastage of ink and media during maintenance done at the time of unloading and reloading media. The aforementioned printing system 100 may also be implemented in existing printers by updating the printer drivers or through a firmware update, wherein the firmware comprises machine readable instructions.

Figure 2:
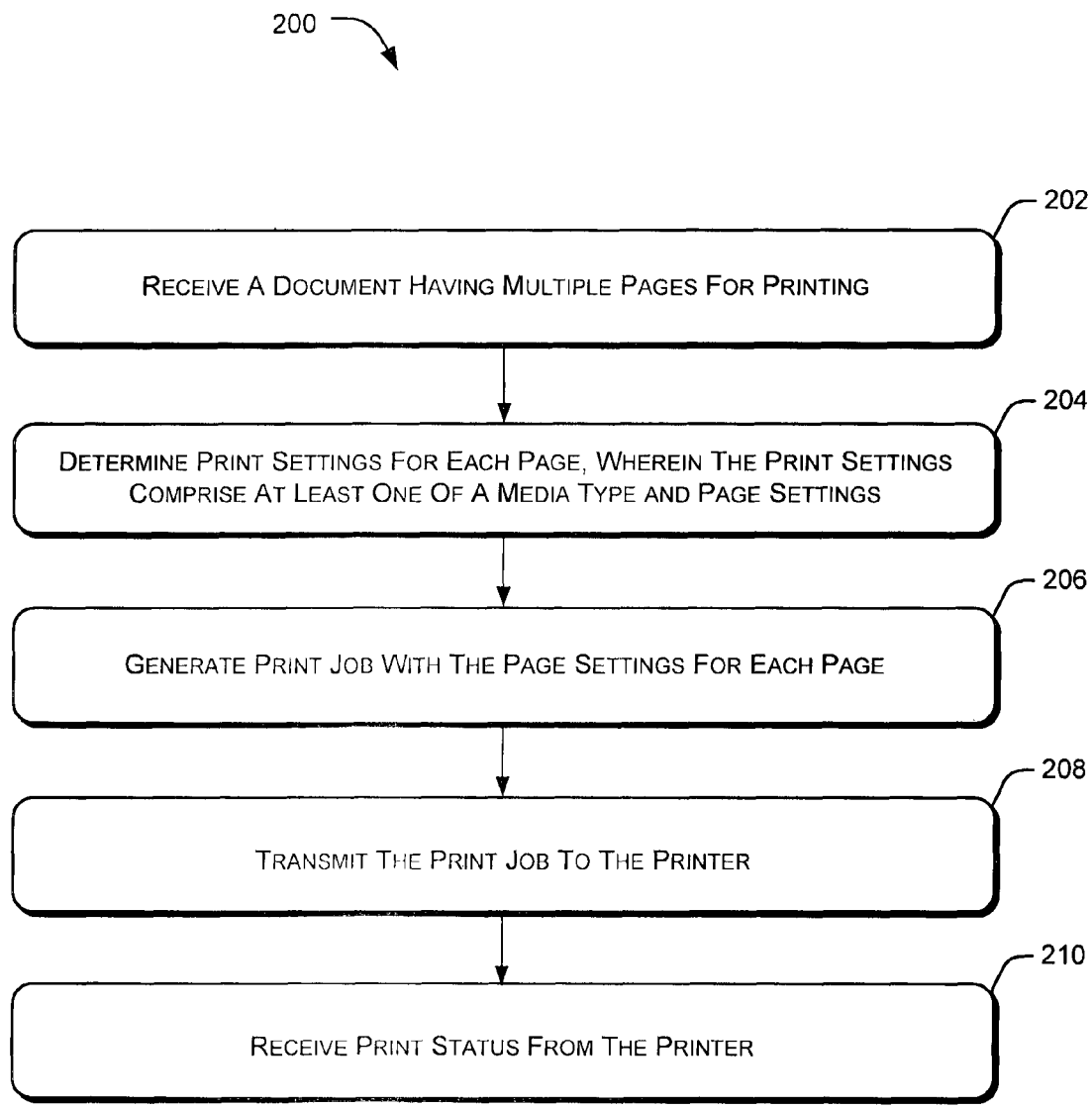
FIG. 2 illustrates a method for creating a print job with multiple print settings, according to an example of the present subject matter.
Figure 3:
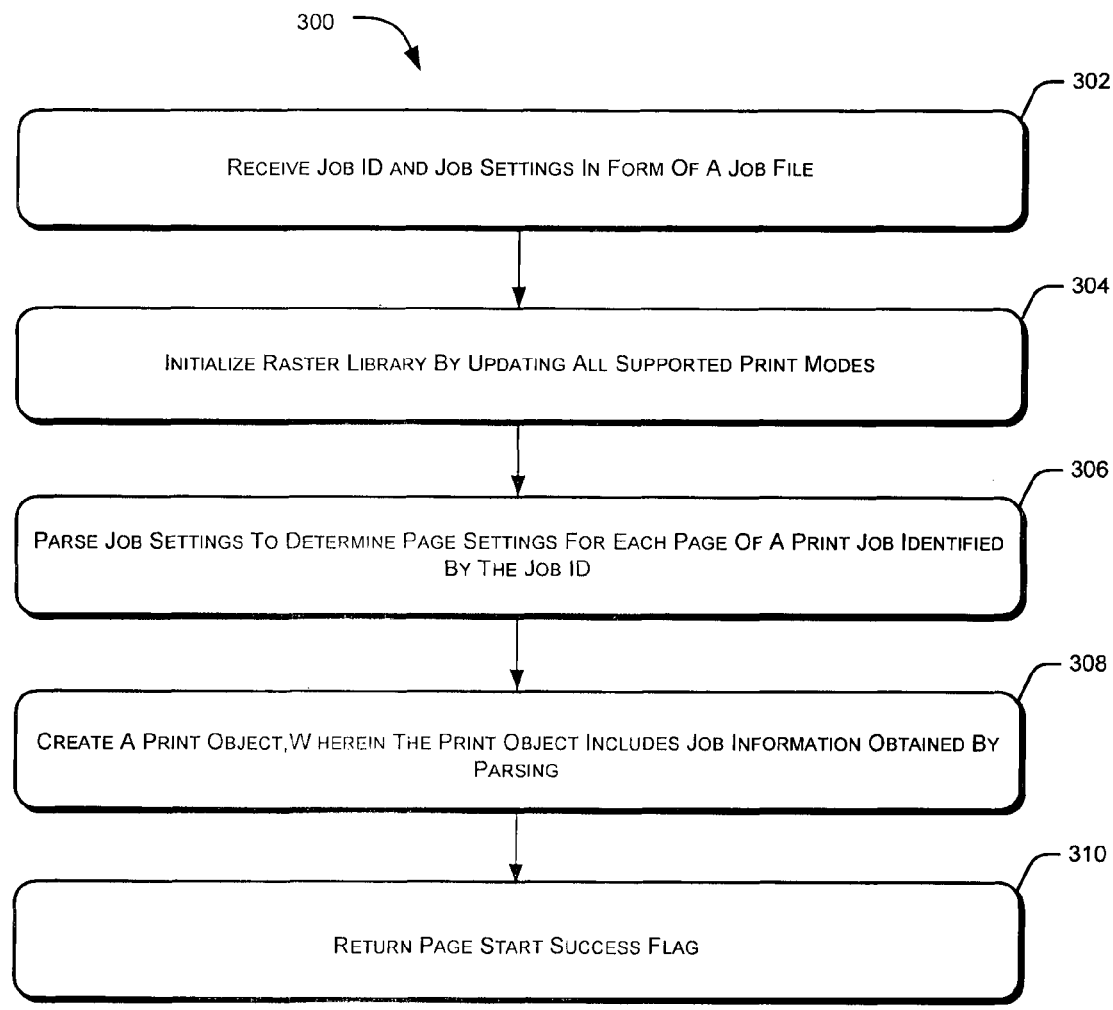
FIG. 3 illustrates a method for initiating a page start function, in accordance with an example of the present subject matter.
Figure 4:
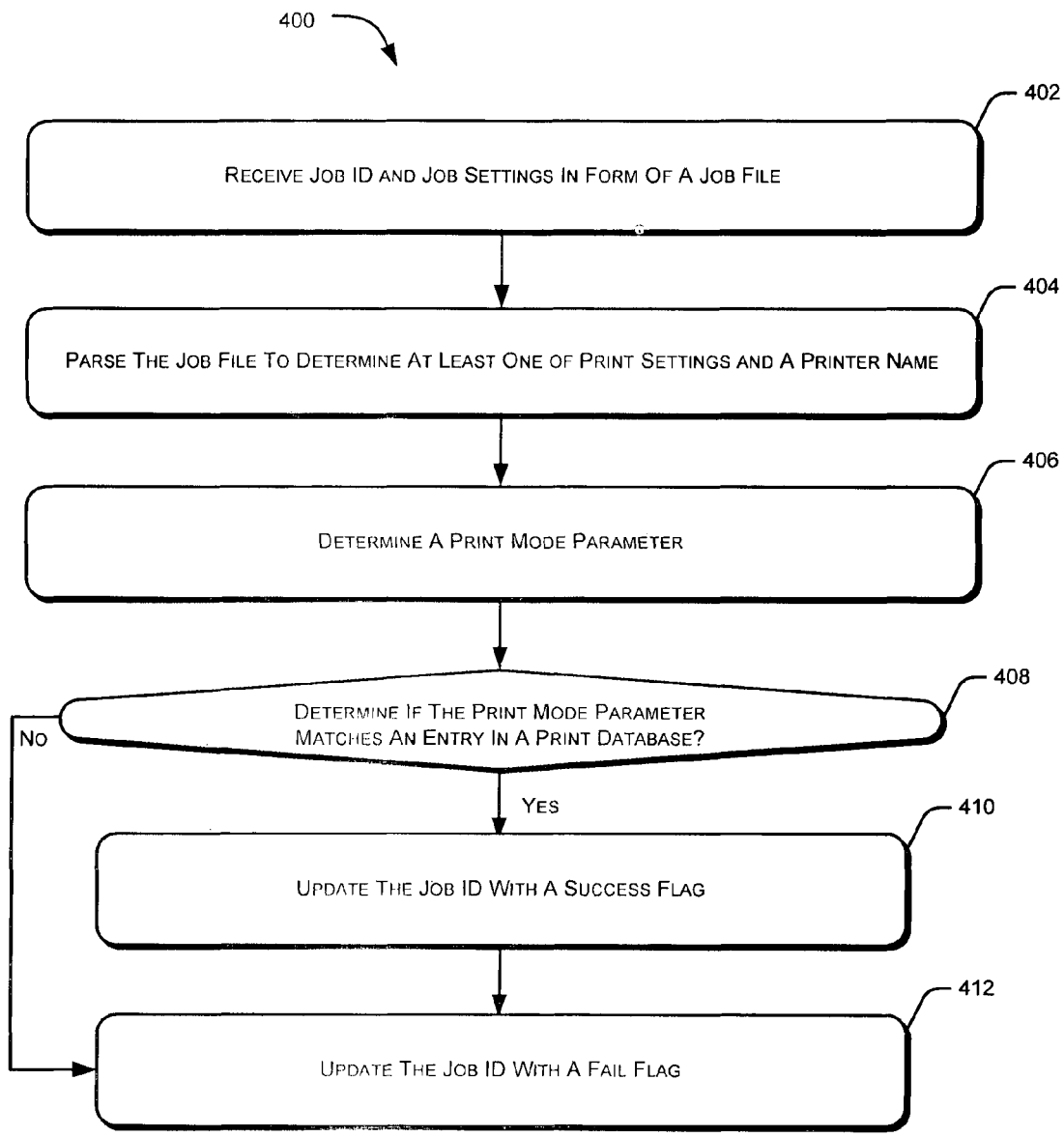
FIG. 4 illustrates a method for initiating a job start function, in accordance with an example of the present subject matter.

FIG. 2 illustrates a method 200 for creating a print job with multiple print settings, according to an example of the present subject matter, whereas FIG. 3 illustrates a method 300 for initiating a page start functionality, in accordance with an example of the present subject matter, and FIG. 4 illustrates a method 400 for initiating a job start, in accordance with an example of the present subject matter. The order in which the methods 200, 300 and 400 are described is not intended to be construed as a limitation, and any number of the described method blocks can be combined in any order to implement the methods 200, 300 and 400, or an alternative method. Additionally, individual blocks may be deleted from the methods 200, 300 and 400 without departing from the spirit and scope of the subject matter described herein. Furthermore, the methods 200, 300 and 400 may be implemented in any suitable hardware, computer-readable instructions, or combination thereof.

A person skilled in the art will readily recognize that steps of the methods 200, 300 and 400 can be performed by programmed computers. Herein, some examples are also intended to cover program storage devices, for example, digital data storage media, which are machine or computer readable and encode machine-executable or computer-executable programs of instructions, where said instructions perform some or all of the steps of the described methods 200, 300 and 400. The program storage devices may be, for example, digital memories, magnetic storage media such as a magnetic disks and magnetic tapes, hard drives, or optically readable digital data storage media.

With reference to method 200 as depicted in FIG. 2, as depicted in block 202, a document having multiple pages is received for printing as a printing assignment. In one example, each page of the document may have to be printed on different media type with same or different print settings. In one implementation, the print job generation module 112 may receive the printing assignment in form of a job file.

As illustrated in block 204, the print settings for each page are determined. In one implementation, the print job generation module 112 may parse the job file determine the print settings for each page of the document. The print settings may be indicative of the media on which each page of the document is to be printed. Further, the print settings may also indicate the page settings for each page. The page settings may comprise a plurality of print parameters, such as margins, whether background image or background text is to be printed, whether the page is to be printed in grayscale, whether header and footer information is to be printed, whether the page is to be printed in duplex, whether the output is to be stacked and the print mode to be used.

As shown at block 206, a print job with page settings for each page is generated. In one implementation, the print job generation module 112 may generate the print job in form of a printer job language (PJL). In said implementation, print job generation module 112 may generate the print job, wherein the pages are arranged in accordance to the media type. In certain cases, where the print control system 102 is connected to a printer which has a single source of media, the print job generation module 112 may operate in a compatibility mode. In compatibility mode, the print job generation module 112 may generate multiple print jobs, wherein each print job is for a specific media type.

At block 208, the generated print job is transmitted to a printer for printing. In one implementation, the print job generation module 112 transmits the generated print job, which may be in form of multiple print commands.

As illustrated in block 210, a print status is received from the printer. For example, on completion of executing the print job, the printer 120 may transmit a success flag to the print control system 102. In case, the execution of the print job fails, the printer 120 may transmit a failure flag to the print control system 102 indicating the cause of failure, such as out of media.

Thus, the method 200 increases productivity by minimizing manual intervention during printing by using printers with multiple sources of media, wherein each source is loaded with a different type of media.

With reference to method 300 as depicted in FIG. 3, as depicted in block 302, a print job is received in form of a job file. The job file indicates a job ID which uniquely identifies the job and job settings. In one implementation may be provided in form of an XML file or a postscript file.

As shown in block 304, a raster library is initialized by updating the library with all supported print modes. The raster library may be understood to be an executable, such as a dynamic linked library (DLL), and a print mode database, which is shared by the manufacturers of the printers with the developers of the raster image processors. The raster image processor developers provide user defined parameters and values for a given print job. These parameters and values are then transmitted, in raster format, to raster library application processing interfaces (APIs) to generate job settings, page settings and the like. The raster library may also be referred to as raster language library as it is internally handles halftone, contone, dithers, and various languages, such as printer command language (PCL), and Hewlett-Packard graphics language (HPGL). In one implementation, the print job generation module 112 may be configured to determine all the printers communicatively coupled to the print control system 102 and ascertain the print modes supported by the printers. The print job generation module 112 then updates the raster library with all the supported print modes.

As illustrated in block 306, the job settings are parsed to determine the page settings for each page of the job. In one implementation, the print job generation module 112 parses the job settings to determine the page settings of each page of the print job. Further, the parsing of the job settings also facilitates determination of the media on which each page of the print job is to be printed.

At block 308 a print object is created, wherein the print object includes job information obtained by parsing. In one implementation, the print job generation module 112 generates the print object which may be transmitted to the printer 120 for execution. In said implementation, the print object may include various print commands which cause the execution of the print job.

As depicted in block 310, a page start success flag is returned. The page start success flag indicates that the page as been successfully created as per the requirements of the print job and the capabilities of the printer. In one implementation, on creation of the print object, the print job generation module 112 updates the page start success flag.

With reference to method 400 as depicted in FIG. 4, as depicted in block 402, a job ID and job settings are received in form of a job file.

As illustrated in block 404, the job file is parsed to determine at least one of print settings and a printer name. In one implementation, the print job generation module 112 parses the job settings to determine the page settings of each page of the print job. Further, the parsing of the job settings also facilitates determination of the media on which each page of the print job is to be printed.

As shown in block 406, a print mode parameter is determined. In one implementation, the print job generation module 112 determines at least one print mode parameter. The print mode parameters are indicative of the mode in which the printer is to be operated while processing the print job. In one implementation, the user may provide the values and/or settings for the print mode parameter. These values and settings are passed to the raster library to select the mode in which the printer would operate to execute the print job.

At block 408 it is determined if the print mode parameter matches an entry in a print database. In one implementation, the print job generation module 112 determines of the print mode parameter matches an entry in the print database, which stores the supported print modes of all the printers connected to the print control system 102.

If at block 408 it is determined that the print mode parameter matches an entry in the print database, then as illustrated in block 410, the job ID is updated with a success flag. In one configuration, the print job generation module 112 updates the job ID with a success flag on determining that the print mode parameter matches an entry in the print database.

If at block 408 it is determined that the print mode parameter does not match an entry in the print database, then as illustrated in block 412, the job ID is updated with a failure flag. In one configuration, the print job generation module 112 updates the job ID with a failure flag on determining that the print mode parameter does not match an entry in the print database. In one example, the raster image processor of the printer may not allow the users to enter unacceptable values for the print mode parameter, i.e., the values which do not match an entry in the print database.

Although implementations for printing with multiple print settings have been described in language specific to structural features and/or methods, it is to be understood that the appended claims are not necessarily limited to the specific features or methods described. Rather, the specific features and methods are disclosed as examples of systems and methods for printing with multiple print settings.

We claim:

1. A printing system comprising a print control system, the print control system comprises: a processor; and a print job generation module, coupled to the processor to: receive a job file indicative of a print assignment comprising a plurality of pages including a first page associated with a first media and a second page associated with a second media, wherein the first media comprises a first media type on which the first page is to be printed and the second media comprises a second media type on which the second page is to be printed, and wherein the second media type is different from the first media type; and generate a single print job for printing the plurality of pages, the single print job comprising a printer job language file, and the single print job including an indication to print the first page on the first media type and an indication to print the second page on the second media type.

2. The printing system as claimed in claim 1, wherein the print job generation module determines page settings for the each of the plurality of pages.

3. The printing system as claimed in claim 1, wherein the print control system comprises a media selection module coupled to the processor, to determine a media on which each of the plurality of pages is to be printed.

4. The printing system as claimed in claim 1, wherein the print control system comprises an accessory selection module coupled to the processor, to determine an accessory to be used for printing each of the plurality of pages.

5. The printing system as claimed in claim 1, wherein the printing system further comprises a printer to execute the generated print job.

6. The printing system as claimed in claim 5, wherein the printer further comprises a plurality of media sources.

7. The printing system as claimed in claim 5, wherein the printer further comprises a plurality of accessories, and wherein the plurality of accessories include at least one of a duplexer, a stacker and a folder.

8. A method of printing with multiple print settings, the method comprising: receiving a job file indicative of a print assignment comprising a plurality of pages; determining a media on which to print each of the plurality of pages, wherein the plurality of pages is to be printed on a plurality of different types of media; and generating a print job for printing each of the plurality of pages, the print job including commands to change the media type, the commands selected based on the determined media type for each of the plurality of pages; and transmitting the print job to a printer.

9. The method as claimed in claim 8, the method further comprising ascertaining whether the determined media is loaded on to a printer for executing the print job.

10. The method as claimed in claim 8, the method further comprising analyzing the job file to determine an accessory to be used for printing each of the plurality of pages.

11. A non-transitory computer-readable medium having a set of computer readable instructions that, when executed, cause a printing system to: receive a job file indicative of a print assignment comprising a plurality of pages, wherein at least one of the plurality of pages has a different print setting from that of another one of the plurality of pages; analyze the job file to determine page settings for the each of the plurality of pages; ascertain a media type on which each of the plurality of pages is to be printed wherein the plurality of pages is to be printed on a plurality of different types of media; and generated a single print job for printing the plurality of pages based on the analyzing and ascertaining, the single print job indicating the media type on which each of the plurality of pages is to be printed, the single print job to be transmitted to a printer.

12. The non-transitory computer-readable medium as claimed in claim 11, wherein the instructions executed further cause the printing system to determine an accessory to be used for printing each of the plurality of pages.

* * * * *